April 25, 1961 J. M. FREUND 2,981,778
SPIN ACTIVATED DEFERRED ACTION BATTERY
Filed Dec. 27, 1949 2 Sheets-Sheet 1
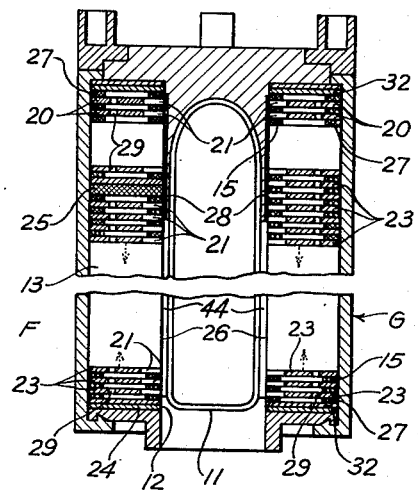
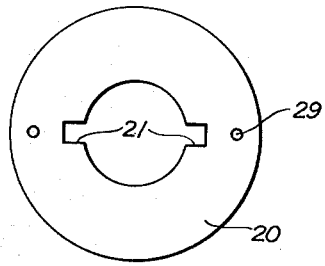
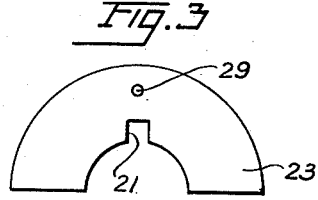
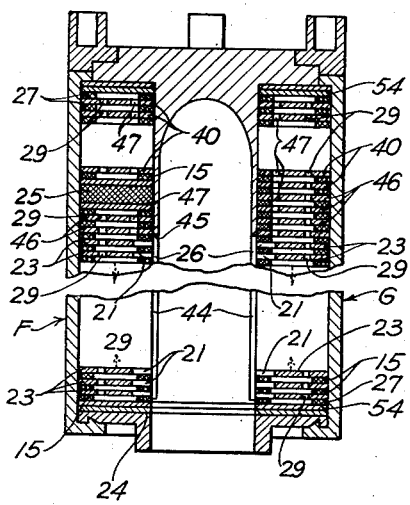
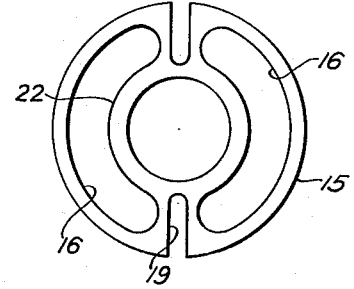
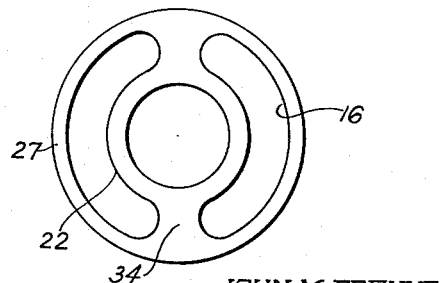
JOHN M. FREUND
INVENTOR
BY G. D. O'Brien
ATTORNEYS April 25, 1961  J. M. FREUND  2,981,778
SPIN ACTIVATED DEFERRED ACTION BATTERY
Filed Dec. 27, 1949  2 Sheets-Sheet 2
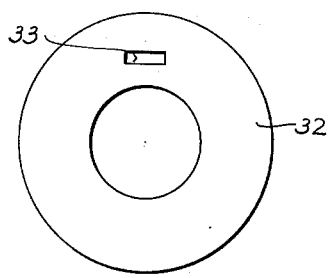
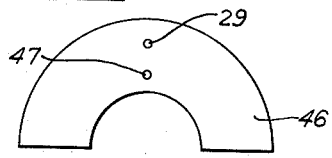
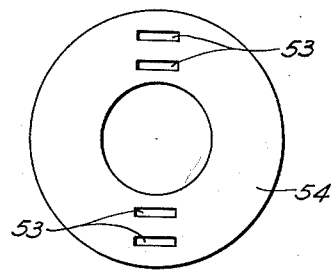
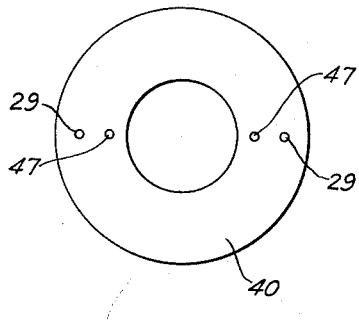
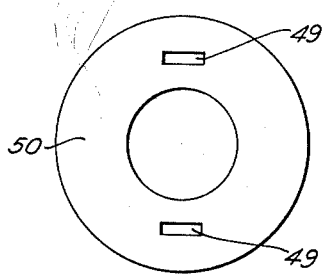
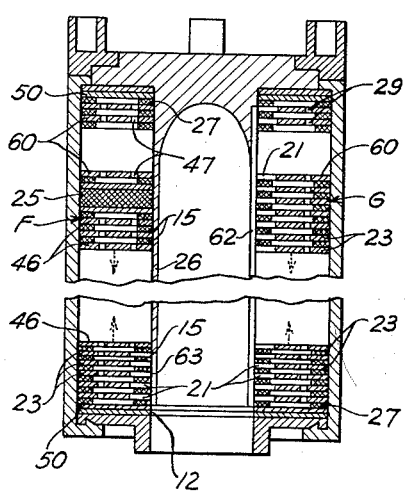
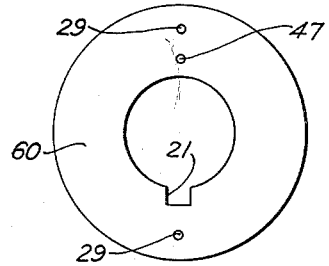
JOHN M. FREUND
INVENTOR
BY
ATTORNEYS United States Patent Office 2,981,778
Patented Apr. 25, 1961

2,981,778

SPIN ACTIVATED DEFERRED ACTION BATTERY

John Mortimer Freund, Rochester, N.Y., assignor, by mesne assignments, to the United States of America as represented by the Secretary of the Navy Filed Dec. 27, 1949, Ser. No. 135,064

8 Claims. (Cl. 136—90)

This invention relates to improvements in small, high voltage batteries of the deferred action type which contain a sealed electrolyte which is not applied to the electrodes until immediately before use, and in particular to means for reducing noise voltage in the battery output due to slow distribution of electrolyte to the cells.

One of the causes of premature detonation of projectiles containing electric fuzes has been the occurrence of excessive noise voltage, or microphonics, in the output of the deferred action type batteries which supply power for the fuzes. Slow attainment of equilibrium in the distribution of electrolyte to the cells has been one of the primary causes of microphonics. This slow distribution of electrolyte appears to result from poor venting of the air entrapped in some of the cells. The electrolyte levels by flowing through aligned small diameter leveling holes in the plates, displacing the air in the volumes between the spaced plates. When the entrapped air must escape via the same leveling hole through which the electrolyte is flowing, and in the opposite direction, intermittent air locks are established which delay the filling of the cells and consequently result in a noise voltage of large amplitude in the battery output.

One cause of poor venting of entrapped air in batteries heretofore manufactured was the existence of only one narrow leveling slot in the top and bottom battery plates through which the electrolyte had to flow in passing from one half of the battery to the other. Another cause was the blocking of air-bleed passages when the thick solution of plastics, known as "slot-blocking compound," which was intended to harden over the filling slots to form the fourth side of an air-bleed passage (the other three sides of which were the edges of the filling slots in the battery plates) was not sufficiently viscous and flowed into the filling slots. The blocked air-bleed passage necessitated counterflow of air and electrolyte through the same leveling holes and retarded the filling of the cells. Furthermore, the "slot-blocking compound" used in batteries heretofore manufactured often flowed into the active plate area, thereby contributing to much of the undesired noise in the output of the batteries when they were activated.

It is an object of the invention to provide positive means for the escape of air during the filling of the cells of a deferred action type battery with electrolyte which will provide more rapid attainment of equilibrium in the level of electrolyte and thus minimize noise voltage in the output of the battery.

It is a further object of the invention to provide improved means of venting air during the filling of the cells of deferred action type batteries with electrolyte which will obviate the use of filling slots in those plates where they do not serve to admit electrolyte to the cells and will eliminate noise voltage in the battery output due to leakage of "slot-blocking compound" into the active plate area.

It is also an object of the invention to provide improved means of allowing counterflow of air and electrolyte between semi-cylindrical halves of a deferred action type battery.

In accomplishing the objects of the invention small diameter air-bleed holes are provided in the plates approximately tangent to the inner edges of the cells to allow the venting of air instead of relying upon filling slots covered with "slot-blocking compound" to form the air-bleed passage. Intercommunication of air and electrolyte between semicylindrical halves of deferred action type batteries is facilitated by providing separate leveling slots in both the top and bottom plates of the battery unit for counterflow of air and electrolyte.

Other objects and advantages of the invention will be apparent from the following description taken in connection with the accompanying drawings which form a part hereof.

In the drawings:

Fig. 1 is a longitudinal view through a typical deferred action type battery of the prior art;

Fig. 2 is a view of an annular battery plate used in the prior art battery construction of Fig. 1;

Fig. 3 is a view of a half-annulus battery plate used in the deferred action type batteries of Figs. 1, 6 and 12;

Fig. 4 illustrates the annular nonconducting separators used below the level of the thick insulator in the deferred action type batteries of Figs. 1, 6 and 12;

Fig. 5 illustrates the annular nonconducting separators used above the level of the thick insulator in the deferred action type batteries of Figs. 1, 6 and 12;

Fig. 6 is a longitudinal view through a deferred action type battery embodying the features of the invention;

Fig. 7 is a view of the top and bottom battery plates of the prior art battery illustrated in Fig. 1;

Fig. 8 is a view of a half-annulus battery plate used in the batteries depicted in Figs. 6 and 12;

Fig. 9 is a view of an annular battery plate used in the construction of the deferred action battery shown in Fig. 6;

Fig. 10 is a view of the top and bottom plates of the battery illustrated in Fig. 6;

Fig. 11 shows a modified form of the plates shown in Fig. 10;

Fig. 12 is a longitudinal view through a deferred action type battery slightly modified from the form shown in Fig. 6; and Fig. 13 illustrates an annular battery plate used in the modification shown in Fig. 12.

In a typical deferred action type battery of the prior art depicted in Fig. 1 of the drawings, the cells were not activated until the occasion for the use of the battery arose. Electrolyte was normally contained within a rupturable ampule 11 which was disposed within the axial compartment 12 in an annular stack 13 of spaced battery plates. As disclosed in the application of David L. Babcock, Serial No. 98,924 filed June 14, 1949, the plates were fabricated of thin metal with a coating of electronegative electrode material, e.g., zinc on one surface thereof and a coating of electropositive electrode material, e.g., carbon on the opposite side, or a single electride coating was applied to a base plate of the opposite electrode material, e.g., a coating of carbon on a sheet of zinc. The low voltage (grid bias C) section and the low voltage, high amperage( filament voltage A) section were constructed of annular plates 20 (as shown in Fig. 2) disposed at the top of the battery, while the high (anode B) voltage section was composed of half-annulus plates 23 (as shown in Fig. 3) arranged concentrically in potential series down one semicylindrical half and up the other half of the lower end 24 of the annular stack 13. Thin annular nonconducting separators 15 (as shown in Fig. 4) formed with a pair of kidney-shaped apertures 16 in the annulus thereof were disposed between the layers of half-annulus plates 23 below the level of the thick insulator 25, while similar separators 27 (as shown in Fig. 5), formed without the circumferential indentations 19 provided between the apertures 16 in the separators 15, were positioned between annular plates 20 above the level of the thick insulator 25. To provide orifices for the introduction of electrolyte into the volumes in the kidney-shaped apertures 16 between the battery plates, two diametrically opposite rectangular filling slots 21 were provided along the inner periphery of the annular plates 20, and a single rectangular filling slot 21 was provided along the inner periphery of the half-annulus plates 23. The bottom of each rectangular filling slot 21 was at a greater radial distance from the axis of the annular stack 13 than the circular arc 22 forming the inner edge of the kidney-shaped apertures 16 in the separators 15. The filling slots 21 thus overlapped the kidney-shaped apertures to form orifices for the inttroduction of electrolyte into the cells. When a projectile containing the battery was fired in a gun, the forces of inertia or setback were sufficient to cause the ampule 11 to collide with a rupturing surface (not shown). The impact shattered the ampule 11, and electrolyte was caused by centrifugal force to flow through the orifices formed by the filling slots 21 into the volumes between adjacent plates.

To withstand the potential difference between the high and low voltage ends of the high (anode B) voltage section, it was necessary to utilize a thick half-annulus insulator 25 in one semicylindrical half of the battery (as shown in Figs. 1, 6 and 12). To shorten the description and to aid in the understanding of the drawings, the semicylindrical half of the battery in which the thick half-annulus separator 25 is assembled will be referred to hereinafter in the specification as the "F" half of the battery, and the opposite semicylindrical half will be called the "G" half. In order to minimize the danger of short circuiting between the high voltage (B+) end of the high (anode B) voltage section and the commoned ground (A—, B— and C+) connection of the other battery sections, the periphery of the axial compartment 12 in the annular stack was covered with an inner jacket 26 of, or "potted" with, plastic material. The plastic jacket 26 had to cover the entire inner periphery of the axial compartment 12 at the height of the insulator 25 in order to be effective to prevent leakage of electrolyte. It was necessary to cover the filling slots 21 during the "potting," i.e., the operation of injecting softened plastic into the axial compartment 12, in order to prevent the flow of softened plastic into the active plate area. A metal insert or "potting post" formed to cover those filling slots 21 below the thick insulator 25 which were to serve as orifices for the introduction of electrolyte into the cells was positioned within the axial compartment 12 during the potting operation, and a film of a thick solution of plastics 28, known as "slot-blocking compound," was used to cover the remaining filling slots 21. This "slot-blocking compound" was intended both to prevent softened plastic from entering the cells during the potting operation and to form the fourth side of an air-bleed passage, the other three sides of which were the edges of the filling slots 21. Small diameter leveling holes 29 were formed in the annular plates 20 and in the half-annulus plates 23 to equalize the electrolyte level in all the cells.

Removal of the potting post after the potting operation left two diametrically opposite rectangular apertures 44 in the inner jacket 26 which extended from the bottom of the plastic jacket to within approximately three levels of plates below the thick insulator 25. After the ampule 11 was smashed upon setback, electrolyte was caused by centrifugal force to flow through the uncovered filling slots 21 into the volumes between adjacent half-annulus battery plates 23. The electrolyte leveled in the "G" half of the battery, by flowing upward parallel to the axis of the stack 13 through the aligned leveling holes 29 into the volumes between annular plates 20.

A single rectangular leveling slot 33 of greater length than the width of the web 34 between the kidney-shaped apertures 16 in the separators 27, was provided in the annular plates 32 (shown in Fig. 7) assembled at the top and bottom of the deferred action type batteries heretofore manufactured to allow counterflow of electrolyte and air from one half of the battery to the other. After filling the cells in the "G" half of the stack 13, the electrolyte flowed through the leveling slot 33 in the top plate 32 and thence downward through the aligned holes 29 to fill the cells between the annular plates 20 in the "F" half of the battery above the level of the thick insulator 25.

As described hereinbefore, the film 28 of "slot-blocking compound" was intended to prevent softened plastic from entering into the stack during the potting operation and to form the fourth side of an air-bleed passage, the other three sides of which were the edges of the filling slots 21. The film 28 of "slot-blocking compound" when hardened had to withstand the high pressures developed during the potting operation. Furthermore, the viscosity of the "slot-blocking compound" had to be sufficiently high when applied to prevent flow into the filling slots 21 and into the active area between the plates, and yet not so great as to impede the application of a thin film at a reasonably rapid rate. Although a solution of glyptal resin and ethyl methacrylate occasionally had the desired properties, it was difficult to obtain consistent results from batch to batch. Too thin coatings of "slot-blocking compound" were ineffective in restraining the softened plastic from entering the volumes between the plates during the potting operation. If the "slot-blocking compound" was not sufficiently viscous and flowed into the active plate area, the excessive solvent in the "slot-blocking compound" had the tendency to loosen the bond between the electrode coatings and the base plate, resulting in excessive noise in the battery output. When the "slot-blocking compound" was not sufficiently viscous, it flowed into the filling slots 21 and thus blocked the passage intended to act as a vent for entrapped air. When the air-bleed passage formed in the filling slots 21 for the venting of the air displaced by the electrolyte was blocked, the air had to escape via the same leveling holes 29 through which the electrolyte was flowing, and in the opposite direction. Slow final leveling with consequent high amplitudes of noise voltage was thus caused because of the intermittent air locks resulting from counterflow of air and electrolyte through the same leveling holes.

One essential feature of my invention consists of providing air-bleed passages distinct from the leveling holes 29 directly in the battery plates which will obviate the necessity of using plates formed with filling slots along the inner diameter thereof when these filling slots do not serve to admit electrolyte to the cells. In the battery embodying the features of my invention shown in Fig. 6, the entire portion of the stack 13 above the level of the thick insulator 25 is composed of annular plates 40 (shown in detail in Fig. 9) with annular separators 27 disposed between the plates 40. It will be noted that the plates 40 are blanked without filling slots 21 along the inner periphery thereof.

The potting post covering the filling slots 21 during the potting operation forms two diametrically opposite rectangular apertures 44 in the inner jacket 26 which extend from the lower end of the jacket 26 to within approximately three levels of plates below the thick insulator 25. All of the half-annulus plates 23 from the lower end 24 of the stack up to the top 45 of the apertures 44 are formed with filling notches 21, but all half-annulus plates 46 (shown in Fig. 8) above this level are blanked without filling notches 21. All of the annular plates 40 and all of the half-annulus plates 46 above the top 45 of the apertures 44 are provided with small diameter air-bleed holes 47 approximately tangent to the circular arc 22 in the separators 15 and 27. The air-bleed holes 47 are all in alignment and permit the venting of the air displaced by the electrolyte as it flows upward through the leveling holes 29.

After the ampule 11 (not shown in Fig. 6) is smashed upon setback, electrolyte is caused by centrifugal force to flow radially outward into the cells through the filling slots 21 in the half-annulus plates 23 in the lower end 24 of the stack. When sufficient liquid has flowed into the kidney-shaped apertures 16, the pressure of centrifugal force urges the electrolyte upward into the "G" half of the stack through the aligned leveling holes 29, while the air displaced by the electrolyte escapes downward through the air-bleed holes 47 in the annular plates 40 and the half-annulus plates 46. This improved venting of air reduces the possible causes of noise in the output of the battery by preventing the formation of air locks during the leveling of the electrolyte. The separate holes provided directly in the plates for the counterflow of liquid and air allow the electrolyte to attain equilibrium in a minimum of time. It will thus be apparent that any possibility of blocking the air-bleed passage, as was frequently encountered heretofore when filling slots 21 covered with a film of "slot-blocking compound" were utilized for the venting of air, has been completely eliminated.

To fill all the cells in the "F" half of the stack, the electrolyte must flow up the "G" half via the leveling holes 29 to the top plate of the stack, and thence via a leveling slot in the top plate to the "F" half, whence it flows downward via the leveling holes 29 as far as the level of the thick insulator 25. In deferred action type batteries heretofore manufactured only a single rectangular leveling slot 33 (as shown in Fig. 7) was provided in the top and bottom battery plates 32 to allow intercommunication between the halves of the battery. The air entrapped in the "F" half of the stack 13 had to escape via the same leveling slot 33 through which the electrolyte was flowing, and in opposite direction, which often hindered rapid filling of the cells due to intermittent air locks. This condition has been eliminated in the embodiment of the invention illustrated in Fig. 6 by the provision of two diametrically opposite pairs of separate slots 53 (as shown in Fig. 10) in the top and bottom annular plates 54 of the stack for counterflow of electrolyte and air, which speeds the filling of the cells in the "F" half of the battery above the level of the insulator 25. The use of a similar plate 54 at the bottom of the battery results in more rapid achievement of equilibrium in the level of the electrolyte in the high (anode B) voltage section of the battery and reduces possible causes of noise in the output thereof.

A slightly different form of deferred action type battery embodying the features of my invention is illustrated in Fig. 12 and described in the aforementioned application of David L. Babcock. To reduce noise voltage in the battery output to a minimum, the filling slots 21 are located so that the amount of electrolyte supplied to each half of the stack approaches that required for final equilibrium. In the "F" half of the battery filling slots 21 are provided in only the lower five half-annulus plates 23, and in the "G" half filling slots 21 are provided in all of the half-annulus plates 23 and in all the annular plates 60. Air-bleed holes 47 are provided in "F" half of the battery in all the annular plates 60 and in all the half-annulus plates 46. A rectangular aperture 62 formed in the inner jacket 26 in the "G" half of the battery extends the entire length of the stack to allow the direct radial flow of electrolyte through the filling slots 21 into all the cells in the "G" half. A rectangular aperture 63 is provided in the inner jacket 26 in the "F" half beginning at the lower end of the jacket and extending upward for approximately five levels of half-annulus plates 23. After an ampule 11 (not shown in Fig. 11) is smashed upon setback, the amount of electrolyte caused by centrifugal force to flow into the cells of the B section in the "F" half through the filling slots 21 in the five half-annulus plates 23 is approximately that required for final equilibrium in the level of electrolyte. As a consequence the flow of electrolyte between the halves of the battery through leveling slots in the bottom plate is minimized, and tests prove that both noise voltage early in the life of this modification of deferred action type battery and the time required to activate the cells thereof are materially lower than in deferred action type batteries heretofore manufactured.

In the modification shown in Fig. 12, the top and bottom plates 50 (as shown in Fig. 11) are formed with two wide leveling slots 49 to replace the two pairs of relatively narrow slots 53 formed in the annular plates 54 which are utilized in the deferred action type battery shown in Fig. 6.

While the embodiment of the present invention as herein described constitutes a preferred form, it is to be understood that other forms might be adopted, all within the scope of the claims which follow.

Having thus described my invention, what I claim as new and desire to secure by Letters Patent of the United States is:

1. A sequence of cells for an annular, spin-activated, deferred action type battery in which centrifugal force resulting from rotation of the battery is utilized to fill the cells with electrolyte, comprising a plurality of congruent, flat, semiannular battery plates disposed perpendicular to the axis of rotation in a semiannular stack, each of said battery plates having a pair of holes therein with the inner hole nearer the axis of rotation than the outer hole and with all of the inner holes and all of the outer holes respectively in alignment, a nonconducting separator plate having an elongated aperture therein between adjacent pairs of battery plates, the elongated apertures being in alignment and being substantially closed by the adjacent battery plates, the inner and outer holes in the battery plates connecting the elongated apertures of the adjacent separator plates, whereby the seeking of equilibrium in the level of the electrolyte will be permitted through the aligned outer holes while air can pass in the opposite direction via the aligned inner holes.

2. A sequence of cells for a spin-activated, deferred action type battery in which centrifugal force resulting from rotation of the battery is utilized to fill the cells with electrolyte, comprising a plurality of flat battery plates arranged in an annular stack and perpendicular to the axis of rotation of the battery, a nonconducting annular separator plate between adjacent battery plates, said separator plate having a pair of elongated apertures therein adapted to contain electrolyte in contact with the adjacent battery plates, the elongated apertures being in alignment and being substantially closed by said adjacent battery plates, each battery plate in the area defined by the elongated apertures having a pair of holes connecting the elongated apertures in adjacent separator plates, one of said holes being nearer the axis of rotation than the other, all of the holes nearer the axis being in alignment and all of the holes further from the axis also being in alignment, whereby during rotation of the battery the seeking of equilibrium in the level of electrolyte will be permitted through the aligned holes further from the axis of rotation and the air in each cell can escape via the aligned holes nearer said axis.

3. An annular, spin-activated, deferred action type battery in which electrolyte is caused by the centrifugal force developed during rotation of the battery to flow into cells established between flat battery plates orthogonal to the axis of rotation, comprising, as the cell structure between the end cells thereof, a plurality of annular and semiannular battery plates arranged in an annular stack, an annular nonconducting separator plate between adjacent battery plates, said separator plate having a pair of elongated apertures therein adapted to contain electrolyte in contact with the adjacent battery plates, the elongated apertures being in alignment and being substantially closed by said adjacent battery plates, each battery plate in the area defined by the elongated apertures having a small diameter leveling hole connecting the elongated apertures of the adjacent separator plates, the leveling holes connecting aligned elongated apertures also being in alignment, certain of said battery plates having a radial filling slot along the inner periphery thereof connecting the cylindrical axial compartment in the annular stack with the elongated apertures of the adjacent separator plates, the remainder of the battery plates each having an air vent hole only connecting the elongated apertures of adjacent separator plates, the air vent holes being in alignment and nearer the axis of rotation than the leveling holes, whereby, during rotation of the battery abutting the axis of the annular stack, electrolyte in said axial compartment can flow radially into the cells established between battery plates having said radial filling slots and thence parallel to the axis of rotation through the aligned leveling holes to fill the cells established between battery plates having only holes connecting the elongated apertures of adjacent separator plates, and air can pass in the opposite direction via the aligned air vent holes.

4. A battery of the deferred action type, comprising, as the cell structure between the end cells thereof, a source of electrolyte, a plurality of battery plates adjacent thereto, a nonconducting separator plate between each adjacent pair of battery plates, said separator plate having at least one aperture therein adapted to contain electrolyte in contact with the adjacent battery plates, the aperture being substantially closed by said adjacent battery plates, certain of said battery plates having an aperture therein connecting the electrolyte source with the apertures of the two adjacent separator plates and also having at least one other aperture therein only connecting apertures of adjacent separator plates, the remainder of said battery plates having only apertures remotely positioned from said electrolyte source and connecting the apertures of adjacent separator plates.

5. A battery of the deferred action type, comprising, as the cell structure between the end cells thereof, a source of electrolyte, a plurality of battery plates adjacent thereto, a nonconducting separator plate between each adjacent pair of battery plates, said separator plate having at least one elongated aperture being substantially closed by said adjacent battery plates, certain of said battery plates having a channel aperture therein connecting the electrolyte source with the elongated apertures of the two adjacent separator plates and also having at least one other aperture therein only connecting the elongated apertures of adjacent separator plates, the remainder of said battery plates having more than one aperture remotely positioned from said electrolyte source and only connecting the elongated apertures of adjacent separator plates with one of said remotely positioned apertures being more distant from the electrolyte source than the other.

6. A battery of the deferred action type, comprising a source of electrolyte, a plurality of battery plates adjacent thereto, a nonconducting separator plate between adjacent pairs of battery plates, said separator plate having a pair of elongated apertures therein adapted to contain electrolyte in contact with the adjacent battery plates, the elongated apertures being in alignment and being substantially closed by said adjacent battery plates, certain of said battery plates having a channel aperture therein connecting the electrolyte source with the elongated apertures of the two adjacent separator plates and also having at least one other aperture therein only connecting elongated apertures of the adjacent separator plates, the remainder of said battery plates having more than one aperture remotely positioned from said electrolyte source and only connecting the elongated apertures of adjacent separator plates with one of said remotely positioned apertures being more distant from the electrolyte source than the other, and a conducting plate positioned at each end of the battery having a plurality of passages therein fluidly connecting the pair of elongated apertures in the respective end separator plates.

7. A battery of the deferred action type, comprising a plurality of battery plates certain of which are annular in shape and others of which are semiannular in shape, said battery plates being insulated by annular nonconducting separator plates positioned therebetween, each of said battery plates having a leveling hole therein, certain of said battery plates having channel apertures in the inner periphery thereof, the remainder of said battery plates having air vent holes therein positioned nearer the axis of the annular plates than said leveling holes, a source of electrolyte positioned within the cylindrical space defined by the plurality of battery plates, certain of said separator plates having elongated apertures therein in fluid connection with the electrolyte source through the channel apertures, the remainder of said separator plates having elongated apertures connected with the first mentioned elongated apertures only by said leveling holes and said air vent holes, the end separator plates being formed with a pair of elongated apertures therein, and a conducting plate positioned at each end of the battery structure having a plurality of passages therein fluidly connecting the pair of elongated apertures in the respective end separator plates.

8. A battery according to claim 7 which also has a thick semiannular insulator positioned in the battery structure between two battery plates which are solid without holes throughout the portions thereof in contact with said insulator.

<center>No references cited.</center>